United States Patent [19]
Shirai et al.

[11] Patent Number: 5,094,430
[45] Date of Patent: Mar. 10, 1992

[54] CONTROL VALVE

[75] Inventors: Takashi Shirai; Michinori Iwamoto; Tetsuo Shimizu; Hiroshi Ohsasa, all of Miyanohigashi, Japan

[73] Assignee: Stec, Inc., Kyoto, Japan

[21] Appl. No.: 664,353

[22] Filed: Mar. 4, 1991

[51] Int. Cl.$^5$ ............................................. F16K 31/06
[52] U.S. Cl. ................................. 251/129.06; 251/86
[58] Field of Search ....................... 251/129.06, 86, 61

[56] References Cited

U.S. PATENT DOCUMENTS 4,529,164  7/1985  Igashira et al. ............... 251/129.06
4,628,330  12/1986  Suga et al. ................. 251/129.06 X
4,907,748  3/1990  Gardner et al. ........... 251/129.06 X Primary Examiner—Arnold Rosenthal
Attorney, Agent, or Firm—Price, Gess & Ubell

[57] ABSTRACT

A control valve, in which a valve body opening and closing a valve mouth is driven by a strain force of a piezostack, characterized in that an upper fixed portion of said piezostack is supported by a ring-like tapered surface or a spherical surface and a lower movable portion of the piezostack is combined with a valve body through a spherical bearing.

The strain output can be surely transmitted to said valve body by holding the piezostack so that no movement other than a strain resulting from the application of voltage may be produced.

23 Claims, 3 Drawing Sheets

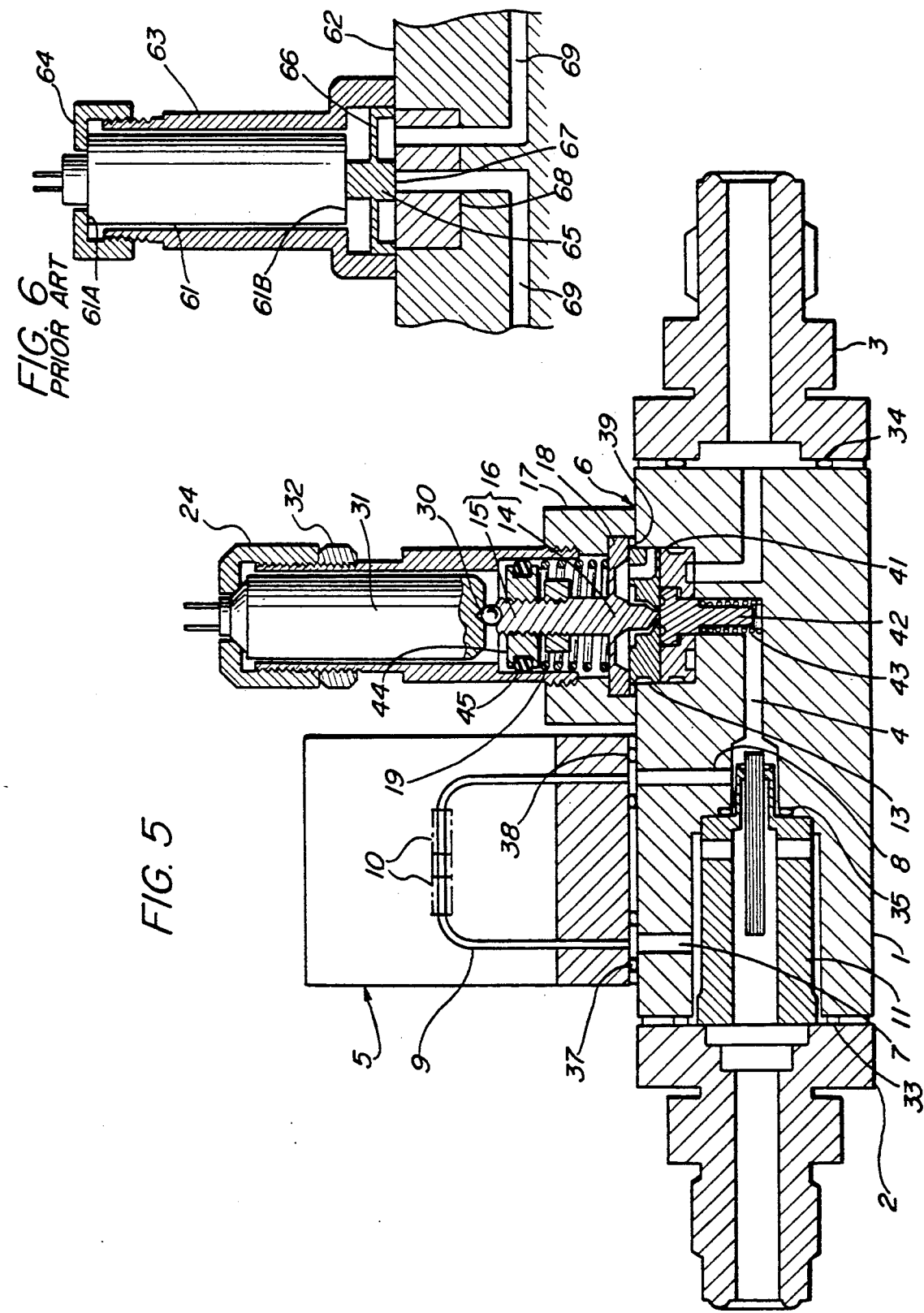

CONTROL VALVE

BACKGROUND OF THE INVENTION

1. Field of the Invention

The present invention relates to a control valve used in a flow control assembly such as a mass flow controller.

2. Description of the Prior Art

A control valve, in which a valve body, capable of opening and closing a valve mouth, is driven by a strain force of a piezostack, has been practically used.

FIG. 6 roughly shows a holding or mounting construction for a piezostack in the conventional control valve. Referring to FIG. 6, reference numeral 61 designates schematically a piezostack comprising a plurality of piezoelements laminated together. The piezostack 61 is housed in a valve case 63 standing on an upper surface of a body block 62 of the control valve. Reference numeral 64 designates an adjusting nut screwed on an upper portion of the valve case 63 for fixing an upper fixed portion 61A of the piezostack 61. Reference numeral 65 designates a valve body provided so as to be engaged with a lower surface of a lower movable portion 61B of the piezostack 61. The valve body 65 is elastically held by means of for example a diaphragm 66.

Upon applying an appointed direct current voltage to the piezostack 61, the respective piezoelements of the piezostack 61 are strained or activated to dislocate the lower movable portion 61B downward and thus descend the valve body 65 by a pressing force, thereby adjusting an openness of a valve mouth 67. In addition, reference numeral 68 designates an orifice block and reference numeral 69 designates a fluid passage.

However, in the control valve in which the valve body 65 is driven by the strain force of the piezostack 61 in the above described manner, it has been absolutely required to prevent any movement other than a strain resulting from an application of voltage during the time when a position of the piezostack 61 is being set as well as after setting the position of the piezostack 61. But, the above described prior art exhibits the following disadvantages:

That is to say, in the above described piezostack 61, both the upper fixed portion 61A and the lower movable portion 61B of the piezostack 61 are formed on a horizontal flat surface so as to be engaged with a lower surface of the adjusting nut 64 and an upper surface of the valve body 65, respectively, so that, in the case where a parallelism of the upper fixed portion 61A and the lower movable portion 61B is not perfect or a verticality of the valve case 63 is not sufficient, as shown by an imaginary line for example adjacent portion 61B in FIG. 6, the lower movable portion 61B and the valve body 65 are so-called open-sided and thus a strain output of the piezostack 61 can not be perfectly transmitted to the valve body 65. As a result, the valve body cannot be operated in the set manner to hinder an appointed flow control according to circumstances. In addition, a set value is shifted by an external force, such as vibration, according to circumstances.

SUMMARY OF THE INVENTION

The present invention has been achieved paying attention to the above described matters and it is an object of the present invention to provide a control valve capable of accurately transmitting a strain output thereof to a valve body by holding a piezostack so that no movement other than a strain resulting from an application of voltage may be produced.

In order to achieve the above described object, a control valve according to the present invention is characterized in that an upper fixed portion of a piezostack is supported by a ring-like tapered surface or a spherical surface and a lower movable portion of the piezostack is combined with a valve body through a spherical bearing.

With the above described construction, the upper fixed portion of the piezostack is supported by the ring-like tapered surface or the spherical surface, so that the piezostack is limited in movement even though it is subjected to an upward force or a force in the right and left direction. And, a uniform contact surface can be obtained even though a parallelism of the upper fixed portion and the lower movable portion and a verticality of a case housing the piezostack are not perfect. In addition, the lower movable portion is combined with the valve body through the spherical bearing, so that a strain output of the piezostack can be surely transmitted to the valve body even though the piezostack is subjected to the force in the right and left direction or the parallelism and the verticality are not perfect and thus the above described object can be perfectly achieved.

BRIEF DESCRIPTION OF THE DRAWINGS

One preferred embodiment of the present invention is shown in FIGS. 1, 2, in which

FIG. 5 is a longitudinal sectional view showing a normal close type mass flow controller with said control valve according to the present invention incorporated therein.

FIG. 6 is a sectional view showing the conventional control valve.

DETAILED DESCRIPTION OF THE PREFERRED EMBODIMENTS

The preferred embodiments of the present invention are below described with reference to the drawings.

Figure 1:
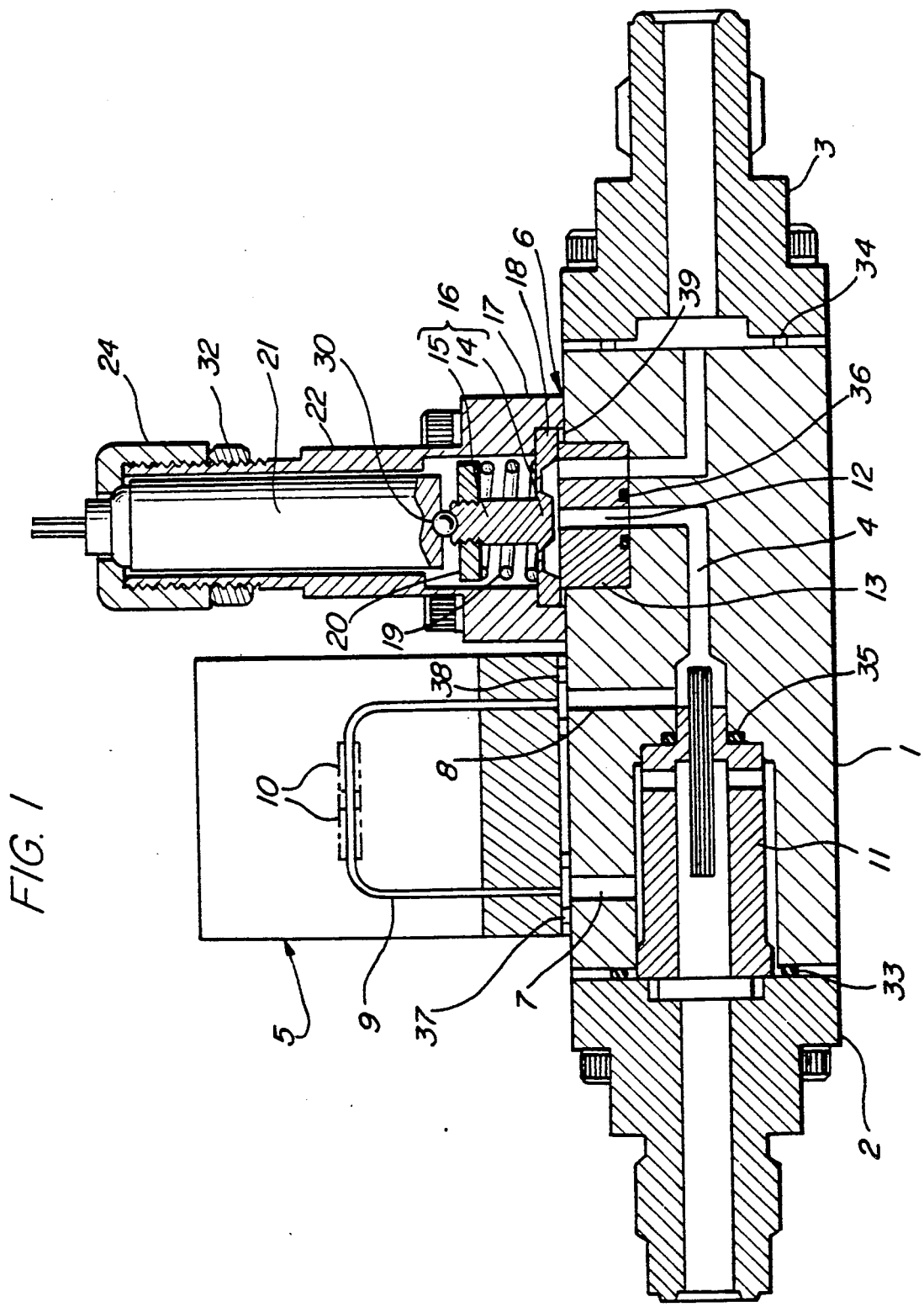
FIG. 1 is a longitudinal sectional view showing a normal open type mass flow controller with a control valve according to the present invention incorporated therein.

Referring to FIG. 1 showing one example of the so-called normal open type mass flow controller, reference numeral 1 designates a body block, reference numeral 2 designates a fluid inlet formed in the body block 1, and reference numeral 3 designating a fluid outlet formed in the body block 1. Reference numeral 4 designates a fluid passage formed between the fluid inlet 2 and the fluid outlet 3. The fluid passage 4 is provided with a mass flowmeter portion 5 and a control valve 6 as a flow control portion. In addition, in the preferred embodiment shown, the mass flowmeter portion 5 is provided on the upstream side of the control valve 6 but this arrangement may be reversed.

The mass flowmeter portion 5 comprises a conduit 9 formed of for example a thin-walled capillary tube extending between a measuring passage inlet 7 and a measuring passage outlet 8 opened so as to communicate with the fluid passage 4 and resistors 10, 10 composed of for example a thermal mass flow sensor wound around the conduit 9. The thermal mass flow sensors 10, 10 are connected with a bridge circuit (not shown). Reference numeral 11 designates a by-pass having constant-shunting ratio characteristics formed in the fluid passage 4.

And, the control valve 6 has the following construction. That is to say, an orifice block 13 provided with a valve mouth or valve orifice 12 is provided in the fluid passage 4 on the downstream side of the by-pass 11 and a valve body 16 comprising a valve head portion 14 and a plunger portion 15 for adjusting an openness of the valve mouth 12 is provided under the condition that the valve head portion 14 is close to the valve mouth 12. And, the valve body 16 is held movably in the up and down direction by means of a metallic diaphragm 18 provided within a lower space of a valve block 17 provided in an upper portion of the body block 1 so that a little gap may be formed against the orifice block 13 during the usual time. Reference numeral 19 designates a spring disposed between said diaphragm 18 and a spring bearing 20 fixedly mounted on the plunger portion 15.

Figure 2:
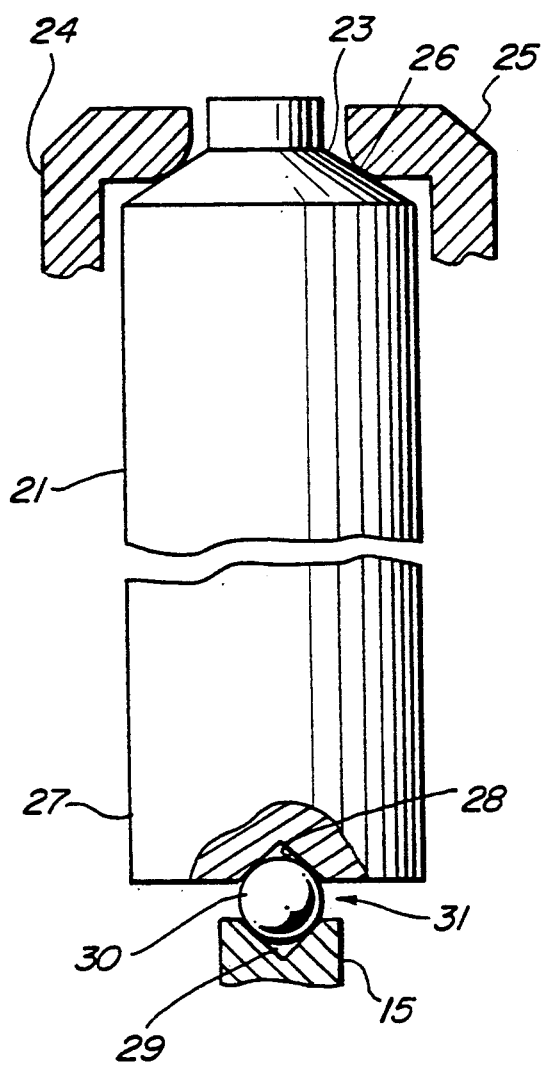
FIG. 2 is a partial sectional view showing one preferred embodiment of a holding construction of a piezostack.

Reference 21 designates a piezostack as the expandle member for driving the valve body 16 in an appointed direction. The piezostack 21 comprises a plurality of piezoelements laminated and is housed in a cylindrical valve case 22 screwed on the valve block 17. A construction of holding the piezostack 21 in the valve case 22 is described with reference to also FIG. 2.

A shoulder portion 23, which is an upper fixed portion of the piezostack 21, is inclined in an obliquely downward direction to form a so-called tapered surface. And, a ring-like or conical inner engaging surface 26 of a brim portion 25 of a union nut-shaped adjusting nut 24 screwed on a screw portion formed on an upper outer circumference of the valve case 22 is formed in a spherical shape to engage the inner engaging surface 26 with the upper fixed portion 23 of the piezostack 21.

In addition, a lower movable portion 27 of the piezostack 21 is provided with a conical dent or indent 28 formed at a center of a lower surface thereof. On the other hand, the plunger portion 15 of the valve body 16 is provided with a reversed conical dent or indent 29, which is in an up and down symmetry to said the dent 28, formed at a center of an upper surface of the plunger portion 15 of the valve body 16. A spherical bearing portion 31 is formed between the lower movable portion 27 and the plunger portion 15 with providing a true sphere 30 so as to be held between both the dent 28 and the dent 29 to ensure an alignment between the valve body 16 and the piezostack.

Furthermore, referring to FIG. 1, reference numeral 32 designates a lock nut and reference numerals 33 to 39 designate a metallic O-ring as a sealing member.

And, in the above described construction, the upper fixed portion 23 of the piezostack 21 is formed in a tapered shape to be supported by a ring-like spherical surface, so that the piezostack 21 is limited in movement even though it is subjected to an upward force or a force in the right and left direction. And, a uniform contact surface can be obtained even though a parallelism of the upper fixed portion 23 and the lower movable portion 27 and a verticality of the case 22 housing the piezostack 21 are not perfect. In addition, the lower movable portion 27 is combined with the valve body 16 through the spherical bearing 31, so that a strain output of the piezostack 21 can be surely transmitted to the valve body 16 even though the piezostack 21 is subjected to the force in the right and left direction or the parallelism and the verticality are not perfect.

The present invention is not limited by the above described preferred embodiment. The preferred embodiment can be variously modified.

Figure 3:
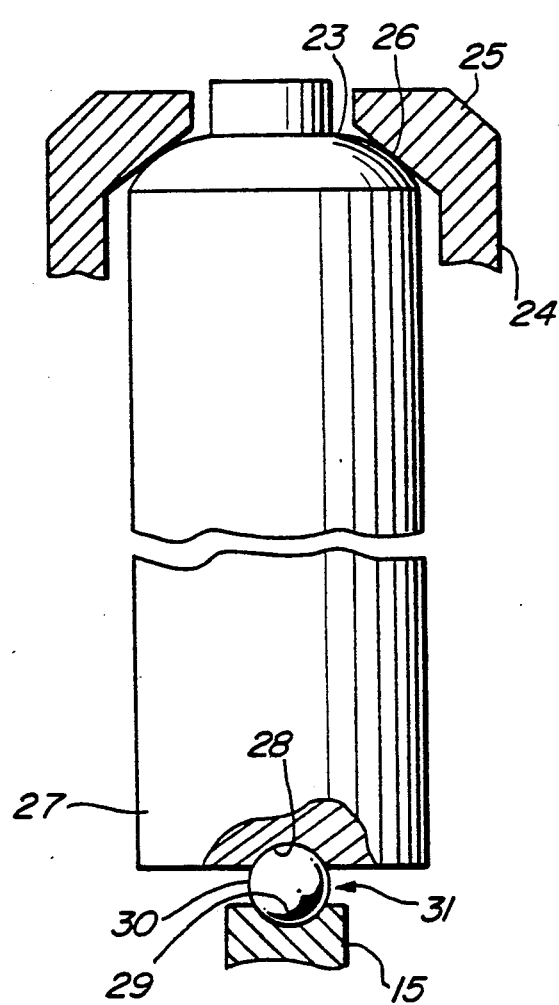
FIG. 3 is a partial sectional view showing another preferred embodiment of said holding construction of said piezostack.

That is to say, as shown in FIG. 3, the upper fixed portion 23 of the piezostack 21 may be formed in a spherical shape while the inner engaging surface 26 of the brim portion 25 of the adjusting nut 24 may be formed so as to be a tapered surface and the dent 28 formed in the lower surface of the lower movable portion 27 and the dent 29 formed in the upper surface of the plunger portion 15 of the valve body 16 may be formed in a spherical shape along an external form of the true sphere 30.

Figure 4:
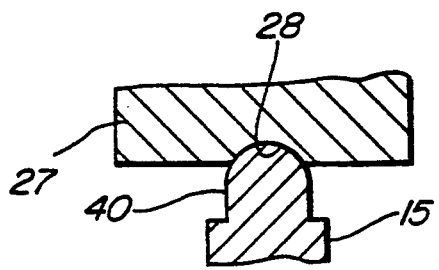
FIG. 4 is a partial sectional view showing a further preferred embodiment of a construction for combining a lower movable portion of the piezostack with a valve body.

Besides, as shown in FIG. 4, the plunger portion 15 may be provided with a semispherical portion 40 projected on an upper portion thereof.

Furthermore, the present invention can be applied also to the so-called normal close-type mass flow controller. One example of its construction is shown in FIG. 5. Referring to FIG. 5, the same reference numerals as in FIG. 1 designate the same one or corresponding members. And, referring to FIG. 5, reference numeral 41 designates a guide block, reference numeral 42 designates a nozzle block, which is always energized by means of a spring 43 to be always engaged with the orifice block 13 disposed above, reference numeral 44 designating a plunger nut, and reference numeral 45 designating a metallic O-ring as a sealing member.

As above described, according to the present invention, the piezostack driving the valve body can be supported so that no movement other than the strain resulting from the application of voltage may be produced, so that the strain output can be surely transmitted to the valve body.

What is claimed is:

1. In a control valve assembly having a valve body capable of opening and closing a valve orifice, the valve body being driven by an application of force from an expandable member, the improvement comprising:
   a support member restraining the movement of the expandable member in a first direction;
   a lower end of the expandable member being formed with an indent, and
   means for transmitting the force from the expandable member through the indent to the valve body in a second direction, including a bearing member having a surface approximately spherical in contact with the indent to compensate for possible misalignment of the valve body and the expandable member.

2. The control valve assembly of claim 1 further including a tapered support surface on the support member for contacting the expandable member.

3. The control valve assembly of claim 1 wherein the expandable member is a piezostack.

4. The control valve assembly of claim 1 wherein the valve body includes a projection with a semispherical surface for contacting the indent.

5. The control valve assembly of claim 1 wherein the indent has a conical configuration.

6. The control valve assembly of claim 1 wherein the indent has a semispherical configuration.

7. The control valve assembly of claim 1 wherein the valve body includes a second indent in contact with the bearing member having a spherical surface.

8. The control valve assembly of claim 7 wherein the second indent has a conical configuration.

9. The control valve assembly of claim 7 wherein the second indent has a semispherical configuration.

10. The control valve assembly of claim 7 further including a tapered support surface on the support member for contacting the expandable member.

11. The control valve assembly of claim 10 wherein the tapered support surface is conical.

12. The control valve assembly of claim 10 wherein the tapered support surface is semispherical.

13. The control valve assembly of claim 10 wherein the expandable member is a piezostack.

14. The control valve assembly of claim 13 wherein the indent has a conical configuration.

15. The control valve assembly of claim 14 wherein the indent has a semispherical configuration.

16. A control valve assembly comprising:
a valve housing with an orifice;
a valve body movable for opening and closing the valve orifice;
a piezostack for providing movement to the valve body;
a support member positioning the piezostack for operative contact with the valve body, including one of a ring-like tapered surface and a spherical shaped surface for restraining an upper portion of the piezostack, and
a spherical bearing, the piezostack has an indent on a lower surface and the valve body has an indent on an upper surface and the spherical bearing is positioned to contact the indents between the piezostack and the valve body to transmit the movement of the piezostack to the valve body.

17. The control valve of claim 16 wherein the respective indents are conical.

18. The control valve of claim 16 wherein the respective indents are semispherical.

19. A control valve assembly comprising:
a valve housing with an orifice;
a valve body movable for opening and closing the valve orifice;
a piezostack for providing movement to the valve body;
a support member positioning the piezostack for operative contact with the valve body;
a spherical bearing member;
means on the piezostack of aligning the piezostack with the spherical bearing, and
means on the valve body for aligning the valve body with the spherical bearing, wherein the movement of the piezostack is transmitted to the valve body through the spherical bearing member and possible misalignment of a respective axis of movement of the valve body and piezostack can be compensated by the respective piezostack means for alignment and valve body means for alignment interface with the spherical bearing member.

20. The control valve assembly of claim 19 wherein the support member includes one of a ring-like tapered surfaces and a spherical surface for restraining an upper portion of the piezostack.

21. The control valve assembly of claim 20 wherein the piezostack upper portion has one of a ring-like tapered surfaces and a spherical shaped surface for contacting the support member.

22. The control valve assembly of claim 14 wherein the alignment means on the valve body includes an indent.

23. The control valve assembly of claim 22 wherein the means on the alignment means on the piezostack includes an indent.

* * * * *